(12) United States Patent
Killilea et al.

(10) Patent No.: US 7,812,090 B2
(45) Date of Patent: Oct. 12, 2010

(54) HIGH PERFORMANCE AQUEOUS COATING COMPOSITIONS

(75) Inventors: T. Howard Killilea, North Oaks, MN (US); Michael C. Wildman, Hoffman Estates, IL (US); Bruce A. Johnson, Crystal Lake, IL (US); Carl H. Weber, Cary, IL (US)

(73) Assignee: Valspar Sourcing, Inc., Minneapolis, MN (US)

( * ) Notice: Subject to any disclaimer, the term of this patent is extended or adjusted under 35 U.S.C. 154(b) by 0 days.

(21) Appl. No.: 12/192,929

(22) Filed: Aug. 15, 2008

(65) Prior Publication Data
US 2009/0035587 A1 Feb. 5, 2009

Related U.S. Application Data

(63) Continuation-in-part of application No. 11/757,916, filed on Jun. 4, 2007.

(60) Provisional application No. 60/810,739, filed on Jun. 2, 2006.

(51) Int. Cl.
*C08F 216/38* (2006.01)
*C08F 130/08* (2006.01)

(52) U.S. Cl. .................. 524/818; 524/806; 525/902; 428/447

(58) Field of Classification Search .............. 524/818, 524/806; 525/902; 428/447
See application file for complete search history.

(56) References Cited

U.S. PATENT DOCUMENTS

| | | |
|---|---|---|
| 2,128,961 A | 9/1938 | Patterson |
| 2,356,542 A | 8/1944 | Sloan |
| 2,633,458 A | 3/1953 | Shokal |
| 2,674,775 A | 4/1954 | Willson |
| 2,727,012 A | 12/1955 | Treat et al. |
| 2,730,517 A | 1/1956 | Vogel et al. |
| 3,010,919 A | 11/1961 | MacKinney et al. |
| 3,049,458 A | 8/1962 | Willard |
| 3,091,551 A | 5/1963 | Robertson |
| 3,219,467 A | 11/1965 | Redican et al. |
| 3,380,831 A | 4/1968 | Cohen et al. |
| 3,449,161 A | 6/1969 | Hindersinn et al. |
| 3,655,423 A | 4/1972 | Lin et al. |
| 3,781,396 A | 12/1973 | Okuda et al. |
| 3,935,173 A | 1/1976 | Ogasawara et al. |
| 3,935,364 A | 1/1976 | Prokesh et al. |
| 4,015,040 A | 3/1977 | Hoshida et al. |

(Continued)

FOREIGN PATENT DOCUMENTS

AU 198060655 A1 3/1981

(Continued)

OTHER PUBLICATIONS

JP 2005307161 A, Nov. 2005, Aoki et al., Derwent AB.*

(Continued)

*Primary Examiner*—Satya B Sastri
(74) *Attorney, Agent, or Firm*—IPLM Group, P.A.

(57) ABSTRACT

Coating compositions for cementitious substrates may be made from a silane-functional multistage latex polymer. The compositions adhere well to cementitious substrates and resist crush damage such as may be caused by stacking coated substrate boards.

18 Claims, 3 Drawing Sheets

U.S. PATENT DOCUMENTS

| | | | |
|---|---|---|---|
| 4,113,893 A | 9/1978 | Hahn | |
| 4,132,526 A | 1/1979 | Schwarz et al. | |
| 4,228,761 A | 10/1980 | Glover et al. | |
| 4,333,867 A | 6/1982 | Sauntson | |
| 4,385,152 A | 5/1983 | Boyack et al. | |
| 4,390,688 A | 6/1983 | Walz et al. | |
| 4,408,018 A | 10/1983 | Bartman et al. | |
| 4,536,534 A | 8/1985 | Singer et al. | |
| 4,582,755 A | 4/1986 | Dietrich | |
| 4,719,149 A | 1/1988 | Aasen et al. | |
| 4,742,121 A | 5/1988 | Toman | |
| 4,852,316 A | 8/1989 | Webb | |
| 4,880,660 A | 11/1989 | Aasen et al. | |
| 4,886,852 A | 12/1989 | Numa | |
| 4,908,229 A | 3/1990 | Kissel | |
| 4,916,004 A | 4/1990 | Ensminger et al. | |
| 5,073,578 A | 12/1991 | Boodaghains et al. | |
| 5,100,948 A | 3/1992 | Aydin et al. | |
| 5,296,530 A | 3/1994 | Bors et al. | |
| 5,426,142 A * | 6/1995 | Rosano et al. | 524/156 |
| 5,461,125 A * | 10/1995 | Lu et al. | 525/293 |
| 5,484,849 A | 1/1996 | Bors et al. | |
| 5,500,457 A | 3/1996 | Sarkar et al. | |
| 5,534,310 A | 7/1996 | Rokoski et al. | |
| 5,559,192 A | 9/1996 | Bors et al. | |
| 5,562,953 A | 10/1996 | Bors et al. | |
| 5,567,767 A | 10/1996 | Smeal et al. | |
| 5,571,863 A | 11/1996 | Smeal et al. | |
| 5,672,379 A * | 9/1997 | Schall et al. | 427/137 |
| 5,681,385 A | 10/1997 | Beckenhauer | |
| 5,688,867 A | 11/1997 | Scheibelhoffer et al. | |
| 5,708,077 A | 1/1998 | Nölken et al. | |
| 5,708,093 A | 1/1998 | Bastelberger et al. | |
| 5,718,943 A | 2/1998 | Hsu et al. | |
| 5,777,053 A | 7/1998 | McBain et al. | |
| 5,798,426 A | 8/1998 | Anton et al. | |
| 5,874,503 A | 2/1999 | Scheibelhoffer et al. | |
| 5,928,778 A | 7/1999 | Takahashi et al. | |
| 5,945,044 A | 8/1999 | Kawai et al. | |
| 5,962,571 A | 10/1999 | Overbeek et al. | |
| 5,973,068 A | 10/1999 | Yamaya et al. | |
| 5,994,428 A * | 11/1999 | Lutz et al. | 523/201 |
| 6,030,447 A | 2/2000 | Naji et al. | |
| 6,045,871 A | 4/2000 | Matt et al. | |
| 6,048,471 A | 4/2000 | Henry | |
| 6,063,864 A | 5/2000 | Mathur et al. | |
| 6,103,352 A | 8/2000 | Takahashi | |
| 6,114,440 A | 9/2000 | Yamaya et al. | |
| 6,136,383 A | 10/2000 | Schwartz et al. | |
| 6,146,710 A | 11/2000 | Symons | |
| 6,162,511 A | 12/2000 | Garnett et al. | |
| 6,235,228 B1 | 5/2001 | Nicholl et al. | |
| 6,346,146 B1 | 2/2002 | Duselis et al. | |
| 6,458,250 B2 | 10/2002 | Holliday et al. | |
| 6,485,601 B1 | 11/2002 | Egan et al. | |
| 6,485,793 B1 | 11/2002 | Ott et al. | |
| 6,492,450 B1 * | 12/2002 | Hsu | 524/423 |
| 6,506,248 B1 | 1/2003 | Duselis et al. | |
| 6,555,625 B1 | 4/2003 | Overbeek et al. | |
| 6,590,025 B1 | 7/2003 | Carlson et al. | |
| 6,635,735 B1 | 10/2003 | Zhang et al. | |
| 6,638,567 B1 | 10/2003 | Beisele | |
| 6,641,629 B2 | 11/2003 | Safta et al. | |
| 6,649,679 B1 | 11/2003 | Stockl et al. | |
| 6,660,386 B2 | 12/2003 | Haque | |
| 6,696,518 B1 | 2/2004 | Dersch et al. | |
| 6,740,423 B2 | 5/2004 | Murase | |
| 6,753,394 B2 | 6/2004 | Weikard et al. | |
| 6,762,230 B2 | 7/2004 | Brandenburger et al. | |
| 6,818,697 B2 | 11/2004 | Zhang et al. | |
| 6,849,338 B2 | 2/2005 | Clemens et al. | |
| 6,893,751 B2 | 5/2005 | Naji et al. | |
| 6,941,720 B2 | 9/2005 | DeFord et al. | |
| 6,998,012 B2 | 2/2006 | Koelliker et al. | |
| 7,049,352 B2 | 5/2006 | Gould et al. | |
| 7,105,593 B2 | 9/2006 | Solomon et al. | |
| 7,148,270 B2 | 12/2006 | Bowe | |
| 7,235,595 B2 * | 6/2007 | Hermes et al. | 523/172 |
| 7,235,603 B2 | 6/2007 | Madle et al. | |
| 7,238,391 B2 | 7/2007 | Dargontina et al. | |
| 7,265,166 B2 * | 9/2007 | Gebhard et al. | 523/205 |
| 7,381,785 B2 | 6/2008 | Detrembleur et al. | |
| 7,449,516 B2 | 11/2008 | Bayer et al. | |
| 2002/0179240 A1 | 12/2002 | Clemens et al. | |
| 2002/0195191 A1 | 12/2002 | Weiss et al. | |
| 2003/0055171 A1 | 3/2003 | Overbeek et al. | |
| 2003/0073778 A1 | 4/2003 | Zhang et al. | |
| 2003/0150359 A1 | 8/2003 | Lassmann | |
| 2003/0153673 A1 | 8/2003 | Schwalm et al. | |
| 2003/0203991 A1 | 10/2003 | Schottman et al. | |
| 2003/0207121 A1 | 11/2003 | McGee | |
| 2003/0224184 A1 | 12/2003 | Hermes et al. | |
| 2004/0082715 A1 | 4/2004 | Bayer et al. | |
| 2004/0176502 A1 | 9/2004 | Raymond et al. | |
| 2004/0198903 A1 | 10/2004 | Madle et al. | |
| 2004/0229978 A1 | 11/2004 | Bowe | |
| 2005/0027079 A1 | 2/2005 | Palmer Lauer et al. | |
| 2005/0053797 A1 | 3/2005 | Rumph et al. | |
| 2005/0203211 A1 * | 9/2005 | Gebhard | 523/205 |
| 2005/0208285 A1 | 9/2005 | Lyons et al. | |
| 2006/0013950 A1 | 1/2006 | Porter et al. | |
| 2006/0024480 A1 | 2/2006 | Lyons et al. | |
| 2006/0048708 A1 | 3/2006 | Hartig | |
| 2006/0135684 A1 | 6/2006 | Killilea | |
| 2006/0135686 A1 | 6/2006 | Kililea et al. | |
| 2006/0288909 A1 | 12/2006 | Naji et al. | |
| 2007/0042192 A1 | 2/2007 | Nguyen et al. | |
| 2007/0110981 A1 | 5/2007 | Killilea et al. | |
| 2007/0259166 A1 | 11/2007 | Killilea et al. | |
| 2007/0259188 A1 | 11/2007 | Wu et al. | |
| 2007/0269660 A1 | 11/2007 | Killilea et al. | |
| 2007/0282046 A1 * | 12/2007 | Killilea et al. | 524/261 |
| 2008/0008895 A1 | 1/2008 | Garner et al. | |

FOREIGN PATENT DOCUMENTS

| | | |
|---|---|---|
| AU | 2005100347 B4 | 5/2005 |
| DE | 33 02 767 A1 | 8/1984 |
| EP | 0 060 505 A1 | 9/1982 |
| EP | 486 278 A1 | 5/1992 |
| EP | 0 623 659 A2 | 11/1994 |
| EP | 0 697 417 A1 | 2/1996 |
| EP | 0705 855 A2 | 4/1996 |
| EP | 0 728 779 B2 | 8/1996 |
| EP | 0 894 780 A1 | 2/1999 |
| EP | 1 454 935 A1 | 9/2004 |
| EP | 1 473 331 A1 | 11/2004 |
| EP | 1 589 083 A2 | 10/2005 |
| EP | 1 650 045 A2 | 4/2006 |
| GB | 1 407 827 | 9/1975 |
| JP | 54 038323 | 3/1979 |
| JP | 01-229242 | 9/1989 |
| JP | 02 308887 | 12/1990 |
| JP | 08-059939 | 3/1996 |
| JP | 11 236281 | 8/1999 |
| JP | 03-44986 A | 12/2000 |
| JP | 2003 251269 | 9/2003 |
| JP | 2005307161 A * | 11/2005 |
| JP | 2006 117812 | 5/2006 |
| SU | 833892 | 5/1981 |
| WO | WO 94/07674 A1 | 4/1994 |
| WO | WO 98/45222 | 10/1998 |
| WO | WO 99/67312 | 12/1999 |
| WO | WO 00/23495 A1 | 4/2000 |

| | | |
|---|---|---|
| WO | WO 00/56826 | 9/2000 |
| WO | WO 01/68547 A1 | 9/2001 |
| WO | WO 02/070623 A2 | 9/2002 |
| WO | WO 03/000761 A1 | 1/2003 |
| WO | WO 03/076536 A1 | 9/2003 |
| WO | WO 03/101918 A2 | 12/2003 |
| WO | WO 2005/071179 A1 | 8/2005 |
| WO | WO 2006/032512 A | 3/2006 |
| WO | WO 2006/065914 A1 | 6/2006 |
| WO | WO 2007/059516 A1 | 5/2007 |
| WO | WO 2007/087458 A1 | 8/2007 |
| WO | WO 2007/089807 A2 | 8/2007 |
| WO | WO 2007/089913 A1 | 8/2007 |
| WO | WO 2007/090132 A1 | 8/2007 |

OTHER PUBLICATIONS

ISR and Written Opinion for PCTUS/2007/070356 dated Oct. 23, 2007.
ASTM D6944-03, Test Method A.
Koleske et al., *Two Thousand Three Additives Guide*, Paint and Coatings Industry, Apr. 2003, pp. 1-76.
Witzeman, J. S. et al., *Comparison of Methods for the Preparation of Acetoacetylated Coating Resins*, Coatings Technology; vol. 62, No. 789, Oct. 1990, pp. 101-112 (and references contained therein).
Clemens, R. J. et al., *A Comparison of Catalysts for Crosslinking Acetoacetylated Resins via the Michael Reaction*, Journal of Coatings Technology, Mar. 1989, vol. 61, No. 770, pp. 83-91.
Clemens, R. J., *A Comparison of Catalysts for Crosslinking Acetoacetylated Resins via the Michael Reaction*, Water-Borne & Higher Solids Coatings Symposium, 1988, New Orleans, LA, 55-67.
Wicks, Z.W. et al., *Epoxy and Phenolic Resins*, Organic Coatings Science and Technology, vol. 1, Chapter XI, pp. 162-187.
Tennebroek et al., *New Polymer Synthesis for (self) Crosslinkable Urethanes and Urethane Acrylics*, 4th Nürnberg Congress; International Centre for Coatings Technology, Paper 17, 2000, 19 pages.
Geurts, J.M. et al., *Self-crosslinkable Urethanes and Urethane/Acrylics*, Verfkroniek Nummer, Jan. 1999.
Geon® Lo-Sope Dispersion Resin, Geon® 171 Vinyl Chloride Homopolymer Technical Data Sheet, PolyOne Corporation, May 2003, 2 pages.
Geon Copolymer Dispersion Resin Geon® 137 Vinyl Chloride Copolymer Technical Data Sheet, PolyOne Corporation, Apr. 1997, 2 pages.
Industrial Research Services, *Test Report No. 54703-1 for Epirez Safe Step 100*, CSIRO, Manuf. & Infrastr. Technology, Australia, May 2004, pp. 1-6.
DSM NeoResins, Technical Data Sheet, DSM NeoResins Inc.,Bulletin XK-90, Jan. 2006, 6 pages.
Tex•Cote® Stretch Product Information, Textured Coatings of America, Inc., Panama City, Florida, Nov. 2003, 3 pages.
UCAR Emulsion Systems Applications, *Architectural Coatings-Exterior-Cement Fiber Board*, Dow Chemical Company product information sheet printed on Oct. 25, 2007 from the following internet archives website at: http://web.archive.org/web/20041022123748/http://www.dow.com/ucarlatex/app/arch/ex_fiber.htm.
Rector, F.D. et al., *Applicatons for the Acetoacetyl Chemistry in Thermoset Coatings*, Journal of Coatings Technology, vol. 61, No. 771, Apr. 1989.
American Society of Testing Materials, ASTM Designation: D523-89 (Reapproved 1999), "Standard Test Method for Specular Gloss;" 5 pages.
American Society of Testing Materials, ASTM Designation: D5402-93 (Reapproved 1999), "Standard Practice for Assessing the Solvent Resistance of Organic Coatings Using Solvent Rubs;" 3 pages.
Eastman Chemical Company, Publications N-319C, Kingport, TN., Dec. 1999, Title Page, Table of Contents, "Acetoacetoxyethyl Methacrylate (AAEM) Acetoacetyl Chemistry," pp. 1-11.
Lewis et al., "Luminescence", Hawley's Condensed Chemical Dictionary, 14th Ed., John Wiley and Sons, Inc., retrieved from Knovel® online; 1 page (2002).
"Photoinitiators for UV Curing," "Darocur 1173", p. 2; Ciba Specialty Chemicals; 8 pages (2003).
U.S. Federal Register, vol. 60, No. 116, pp. 31633-31637, Jun. 16, 1995.
Wicks, Zeno W. Jr., et al., "Latexes", Organic Coatings, Science and Technology, Second Edition, (Wiley-Interscience, New York, 1999), Title Page, Copyright Page, Chapter 8, p. 143.
Dow® Z-6018 Intermediate Product Information, "Silicone Intermediates", 3 pgs., (Aug. 28, 2006).
ASTM D6944-03, Test Method A (2003).

* cited by examiner

HIGH PERFORMANCE AQUEOUS COATING COMPOSITIONS

CROSS-REFERENCE TO RELATED APPLICATIONS

This application is a continuation-in-part of application Ser. No. 11/757,916 filed Jun. 4, 2007, which in turn claims priority from U.S. Provisional Application Ser. No. 60/810,739 filed Jun. 2, 2006, the disclosures of both of which are incorporated herein by reference.

BACKGROUND

Hard, abrasion resistant coatings are used over a variety of substrates, including cement, wood, and porous substrates. Particularly demanding substrates include horizontal substrates such as sidewalks, floor tiles, cement garage floors and decks. Unfortunately, many of the commercially available coatings in use today for these substrates suffer from problems such as poor adhesion, or poor water resistance (e.g., "blushing").

Cement and fiber cement substrates have an additional issue, in that they typically require hard, abrasion resistant coatings with excellent adhesion. In the past, this has been addressed by using higher-Tg polymer systems. Unfortunately, volatile organic content (VOC) solvents generally must be used to achieve proper coalescence of higher-Tg polymers. Consequently, there is an unmet need to develop acceptable low VOC aqueous based coatings that are hard, blush resistant, abrasion resistant and offer excellent adhesion to cement and fiber cement substrates.

In addition, there is an unmet need for improved fiber cement articles that resist damage from repeated freezing and thawing of water absorbed into the substrate. This need is particularly acute in colder climates where freeze-thaw mechanisms can occur. Prefinished fiber cement siding products can also be visually marred or damaged during storage. One damage mechanism is caused by the heavy boards being stacked against or atop one another. In some cases the weight against the bottom boards may exceed 6 kg/cm$^2$ or even 10 kg/cm$^2$, and may damage the finish. In particular, the peaks of the embossed surface can be crushed, and the flattened peaks can appear as glossy spots.

SUMMARY

The above-mentioned application Ser. No. 11/757,916 describes coating compositions including water, a multistage latex polymer and a silane coupling agent. Silane functionality may be provided in the multistage latex polymer by using a functionalized silane capable of copolymerizing with the latex polymer during or after latex formation. For example, in one embodiment, the silane coupling agent contains a functional group (e.g., a vinyl, allyl, acrylate or mercapto group) that is capable of copolymerizing with a monomer from which the multistage latex polymer is formed (for example, by participating in chain-growth polymerization during formation of the multistage latex polymer), and which is present during at least one stage of the multistage latex polymer formation. In another embodiment, the silane coupling agent has a functional group (e.g., an epoxy, amino or isocyanato group) and is reacted with functionality (e.g., acetoacetoxy, carboxy, or amino functionality) on the latex polymer after the multistage latex polymer has been formed. The disclosed silane-functional latex polymers provide high performance coating compositions which adhere well to cementitious substrates, and have improved stability.

The present invention thus provides in one aspect an aqueous coating composition comprising a silane-functional multistage latex polymer. The multistage latex polymer includes two or more polymer stages having different Tg values. In a preferred embodiment, the silane-functional multistage latex polymer includes at least one soft stage having a Tg between about −65 and about 30° C. and at least one hard stage having a Tg between about 30 and about 230° C.

In another aspect, the invention provides a method for preparing a coated article, which method comprises providing a cementitious substrate, coating at least a portion of the substrate with an aqueous coating composition comprising a silane-functional multistage latex polymer, and allowing the coating composition to harden.

In yet another aspect, the present invention provides coated articles comprising a cementitious substrate having at least one major surface on which is coated a layer comprising an aqueous coating composition comprising a silane-functional multistage latex polymer.

The above summary of the present invention is not intended to describe each disclosed embodiment or every implementation of the present invention. The description that follows exemplifies certain illustrative embodiments. In several places throughout the application, guidance is provided through lists of examples, which examples can be used in various combinations. In each instance, the recited list serves only as a representative group and should not be interpreted as an exclusive list.

The details of one or more embodiments of the invention are set forth in the accompanying drawings and this specification. Other features, objects, and advantages of the invention will be apparent from the description and drawings, and from the claims.

BRIEF DESCRIPTION OF THE DRAWING

Like reference symbols in the various figures of the drawing indicate like elements. The elements in the drawing are not to scale.

DETAILED DESCRIPTION

Figure 1:
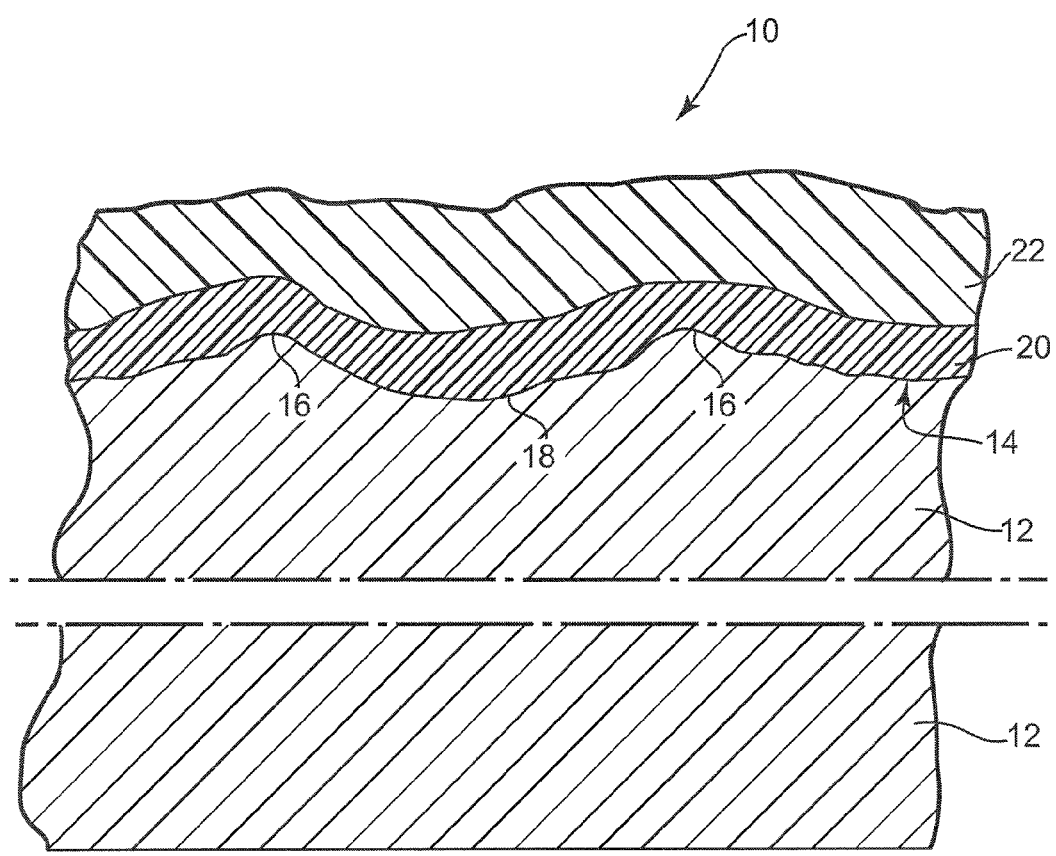
FIG. 1 is a schematic cross-sectional view of a coated fiber cement article.

The recitation of a numerical range using endpoints includes all numbers subsumed within that range (e.g., 1 to 5 includes 1, 1.5, 2, 2.75, 3, 3.80, 4, 5, etc.).

The terms "a," "an," "the," "at least one," and "one or more" are used interchangeably. Thus, for example, a coating composition that contains "an" additive means that the coating composition includes "one or more" additives.

The terms "board" or "fiberboard" refer to a generally planar component suitable for attachment to a building exterior surface, including lap siding, vertical siding, soffit panels, trim boards, shingle replicas, stone replicas and stucco replicas.

The term "cementitious" refers to a substrate or material that comprises cement and has the properties or characteristics of cement, or that comprises a chemical precipitate, preferably of carbonates, having the characteristics of cement. Examples of cementitious substrates and materials include cement, burnished cement, concrete, polished concrete and cement fiberboard, and examples of places or applications where cementitious substrates may be employed include floors (e.g., garage floors), tiles (e.g., floor tiles), decks, boards and panels (e.g., fiber cement boards), and the like.

The term "comprises" and variations thereof does not have a limiting meaning where such term appears in the description or claims. Thus, a composition comprising an ethylenically unsaturated compound means that the composition includes one or more ethylenically unsaturated compounds.

The terms "group" and "moiety" are used to differentiate between chemical species that allow for substitution or that may be substituted and those that do not allow substitution or that may not be so substituted. Thus, when the term "group" is used to describe a chemical substituent, the described chemical material includes substituted and unsubstituted groups, where the substituent groups may include O, N, Si, or S atoms, for example, in the chain (e.g., an alkoxy group) as well as carbonyl groups and other substituent groups. The term "organic group" thus refers to a hydrocarbon (e.g., hydrocarbyl) group with optional elements other than carbon and hydrogen in the chain, such as oxygen, nitrogen, silicon or sulfur. Representative organic groups include aliphatic groups, cyclic groups, and combinations of aliphatic and cyclic groups (e.g., alkaryl or aralkyl groups). The term "aliphatic group" refers to a saturated or unsaturated linear or branched organic group. For example, this term is used to encompass alkyl, alkenyl, and alkynyl groups. The term "alkyl group" refers not only to pure open chain saturated hydrocarbon alkyl substituents, such as methyl, ethyl, isopropyl, t-butyl, heptyl, dodecyl, octadecyl, amyl, 2-ethylhexyl, and the like, but also to substituted alkyl groups having substituents known in the art, such as hydroxy, alkoxy, alkylsulfonyl, halo, cyano, nitro, amino, carboxyl, and the like. The term "alkenyl group" refers to an unsaturated linear or branched hydrocarbon group with one or more carbon-carbon double bonds and likewise may have substituents known in the art. Non-limiting examples of alkenyl groups include groups such as vinyl, 1-propenyl, 2-propenyl, 1,3-butadienyl, 1-butenyl, 2-butenyl, 1-pentenyl, 2-pentenyl, 1-hexenyl, 2-hexenyl, heptenyl, octenyl and the like. The term "alkynyl group" refers to an unsaturated linear or branched hydrocarbon group with one or more carbon-carbon triple bonds and likewise may have substituents known in the art. Non-limiting examples of alkynyl groups include ethynyl, 1-propynyl, 2-propynyl, 1-butynyl, 2-butynyl, 3-butynyl, 1-pentynyl, 2-pentynyl, 1-hexynyl, 2-hexynyl, heptynyl, octynyl and the like. The term "cyclic group" refers to a closed ring hydrocarbon group that can be classified as an alicyclic group, aromatic group (aryl group), or heterocyclic group. The term "alicyclic group" refers to a cyclic hydrocarbon group having properties resembling those of aliphatic groups. Non-limiting examples of alicyclic groups include cyclopropyl, cyclobutyl, cyclopentyl, cyclohexyl, cycloheptyl, cyclooctyl and the like. The terms "aromatic group" or "aryl group" refer to a mono- or polycyclic aromatic hydrocarbon group including phenyl or naphthyl groups. The term "heterocyclic group" refers to a closed ring hydrocarbon group in which one or more of the atoms in the ring is an element other than carbon (e.g., nitrogen, oxygen, sulfur, etc.). When the term "moiety" is used to describe a chemical compound or substituent, only the unsubstituted chemical material is intended to be included. Thus, the phrase "hydrocarbyl moiety" refers to unsubstituted organic moieties containing only hydrogen and carbon, and the phrase "alkyl moiety" refers to pure open chain saturated hydrocarbon alkyl substituents such as methyl, ethyl, propyl, t-butyl, and the like.

A "latex" polymer means a dispersion or emulsion of polymer particles formed in the presence of water and one or more secondary dispersing or emulsifying agents (e.g., a surfactant, alkali-soluble polymer or mixtures thereof) whose presence is required to form the dispersion or emulsion. The secondary dispersing or emulsifying agent is typically separate from the polymer after polymer formation. In some embodiments a reactive dispersing or emulsifying agent may become part of the polymer particles as they are formed.

The phrase "low VOC" when used with respect to a liquid coating composition means that the coating composition contains less than about 10 weight % volatile organic compounds, more preferably less than about 7% volatile organic compounds, and most preferably less than about 4% volatile organic compounds based upon the total liquid coating composition weight.

The term "(meth)acrylic acid" includes either or both of acrylic acid and methacrylic acid, and the term "(meth)acrylate" includes either or both of an acrylate and a methacrylate.

The term "multistage" when used with respect to a latex polymer means the polymer was made using discrete charges of one or more monomers or was made using a continuously-varied charge of two or more monomers. Usually a multistage latex will not exhibit a single Tg inflection point as measured using DSC. For example, a DSC curve for a multistage latex made using discrete charges of one or more monomers may exhibit two or more Tg inflection points. Also, a DSC curve for a multistage latex made using a continuously-varied charge of two or more monomers may exhibit no Tg inflection points. By way of further explanation, a DSC curve for a single stage latex made using a single monomer charge or a non-varying charge of two monomers may exhibit only a single Tg inflection point. Occasionally when only one Tg inflection point is observed, it may be difficult to determine whether the latex represents a multistage latex. In such cases a lower Tg inflection point may sometimes be detected on closer inspection, or the synthetic scheme used to make the latex may be examined to determine whether or not a multistage latex would be expected to be produced.

The terms "preferred" and "preferably" refer to embodiments which may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

The terms "topcoat" or "final topcoat" refer to a coating composition which when dried or otherwise hardened provides a decorative or protective outermost finish layer on a substrate, e.g., a fiber cement board attached to a building exterior. By way of further explanation, such final topcoats include paints, stains or sealers capable of withstanding extended outdoor exposure (e.g., exposure equivalent to one year of vertical south-facing Florida sunlight) without visually objectionable deterioration, but do not include primers that would not withstand extended outdoor exposure if left uncoated, viz., without a topcoat.

Referring to FIG. 1, a coated article 10 of the present invention is shown in schematic cross-sectional view. Article 10 includes a cement fiberboard substrate 12. Substrate 12 typically is quite heavy and may for example have a density of about 1 to about 1.6 g/cm$^3$ or more. The first major surface 14 of substrate 12 may be embossed with small peaks or ridges 16 and valleys 18, e.g., so as to resemble roughsawn wood. Major surface 14 may have a variety of other surface configurations, and may resemble a variety of building materials other than roughsawn wood. An optional further layer or layers 20 (which may for example be a sealer, primer or layers of both sealer and primer) may lie atop surface 14. Layer 20 can provide a firmly-adhered base layer upon which one or more firmly-adhered layers of final topcoat 22 may be formed, and may hide mottling or other irregularities (arising in some instances when article 10 is dried in a factory) which may otherwise be visible on surface 14. If a primer, layer 20 may include a high Pigment Volume Concentration (PVC), e.g., about 45% or more. Layer 20 is however not weather-resistant or decorative and is not designed or intended to serve as a final topcoat. Topcoat 22 desirably is both decorative and weather-resistant, and may be applied to article 10 at the location where article 10 is manufactured or after article 10 has been attached to a building or other surface. Topcoat 22 desirably provides a crush-resistant surface which withstands the forces that may be imparted to article 10 during warehousing and shipping operations such as long-term storage and transporting of prefinished stacked cementboard to a jobsite. Topcoat 22 thus may provide reduced visual coating damage and, consequently, less need for touch-up repairs or recoating after article 10 has been attached to a building.

The differences in height between peaks 16 and valleys 18 in major surface 14 typically are much greater than those shown in FIG. 1; the thicknesses of layer 20 and topcoat 22 have been magnified in FIG. 1 for emphasis. The typical actual differences in height between peaks 16 and valleys 18 in major surface 14 may for example be about 1 to about 5 mm.

Figure 2:
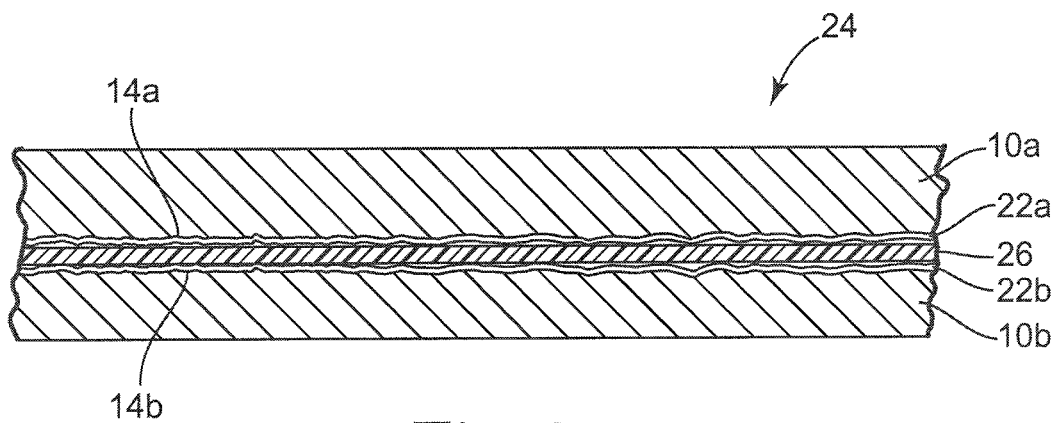
FIG. 2 is a schematic cross-sectional view of a face-to-face pair of coated fiber cement articles with a protective liner therebetween.

FIG. 2 shows a schematic cross-sectional view of a face-to-face pair 24 of coated fiber cement articles 10a, 10b whose embossed faces 14a, 14b may be covered with optional primer, optional sealer or both primer and sealer (not shown in FIG. 2) and topcoats 22a, 22b. Topcoats 22a, 22b face one another but are separated and protected somewhat from damage by protective liner 26 located between topcoats 22a, 22b. The arrangement shown in FIG. 2 can provide better crush resistance when tall stacks of articles 10 are piled atop one another.

Figure 3:
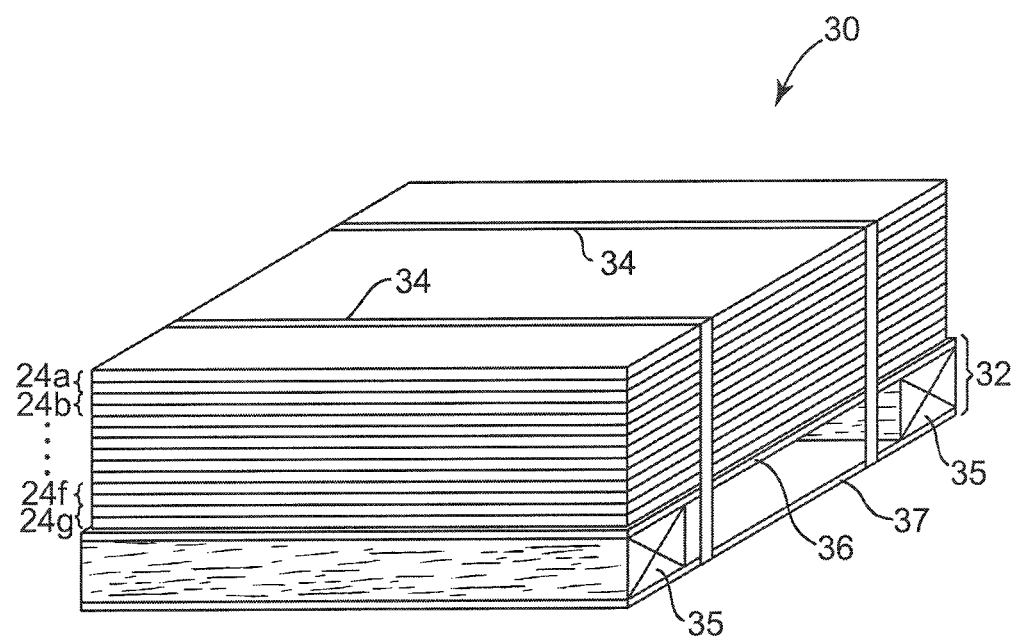
FIG. 3 is a perspective view of a pallet of coated fiber cement articles.

FIG. 3 shows a perspective view of a loaded pallet 30 including a pallet 32 upon which has been loaded a plurality of eight board pairs 24a through 24h. Optional strapping tape 34 helps stabilize loaded pallet 32. Cross beams 35 sandwiched between upper horizontal platform 36 and lower horizontal platform 37 also stabilize loaded pallet 32. Persons having ordinary skill in the art will recognize that other pallet configurations may be employed. For example, the pallet may include more cross-beams 35 (e.g., three, four, five or more) or may omit lower horizontal platform 37. Persons having ordinary skill in the art will recognize that pallet 32 may be loaded with fiber cement boards having shapes other than the large siding boards shown in FIG. 3. For example, a pallet may be loaded with rows of side-by-side planks, soffit panels, trim boards, shingles, stone replicas, stucco replicas and other available board configurations. Persons having ordinary skill in the art will also recognize that the height of a loaded pallet 32 may vary, and for example may be about 0.2 to about 2 meters.

The disclosed compositions may be applied to a variety of substrates, including cement, cement tiles, and fiber cement substrates. The composition may also be applied to wood and wood substitutes. The compositions are particularly useful for coating cementitious substrates including cement floors and fiber cement articles. A variety of fiber cement substrates may be employed. Fiber cement substrates typically are composites made from cement and filler. Exemplary fillers include wood, fiberglass, polymers or mixtures thereof. The substrates can be made using methods such as extrusion, the Hatschek method, or other methods known in the art. See, e.g., U.S. Patent Application Publication No. US 2005/0208285 A1; Australian Patent Application No. 2005100347; International Patent Application No. WO 01/68547 A1; International Patent Application No. WO 98/45222 A1; U.S. Patent Application Publication No. US 2006/0288909 A1; and Australian Patent Application No. 198060655 A1. Fiber cement composites can include unprimed fiber cement substrates and commercially available pre-primed or pre-painted fiber cement substrates which may be topcoated as described below. Non-limiting examples of such substrates include siding products, boards and the like, for uses including fencing, roofing, flooring, decking, wall boards, shower boards, lap siding, vertical siding, soffit panels, trim boards, shaped edge shingle replicas and stone or stucco replicas. One or both major surfaces of the substrate may be profiled or embossed to look like a grained or roughsawn wood or other building product, or scalloped or cut to resemble shingles. The uncoated substrate surface typically contains a plurality of pores with micron- or submicron-scale cross-sectional dimensions.

A variety of suitable fiber cement substrates are commercially available. For example, several preferred fiber cement siding products are available from James Hardie Building Products Inc. of Mission Viejo, Calif., including those sold as HARDIEHOME™ siding, HARDIPANEL™ vertical siding, HARDIPLANK™ lap siding, HARDIESOFFIT™ panels, HARDITRIM™ planks and HARDISHINGLE™ siding. These products are available with an extended warranty, and are said to resist moisture damage, to require only low maintenance, to not crack, rot or delaminate, to resist damage from extended exposure to humidity, rain, snow, salt air and termites, to be non-combustible, and to offer the warmth of wood and the durability of fiber cement. Other suitable fiber cement siding substrates include AQUAPANEL™ cement board products from Knauf USG Systems GmbH & Co. KG of Iserlohn, Germany, CEMPLANK™, CEMPANEL™ and CEMTRIM™ cement board products from Cemplank of Mission Viejo, Calif.; WEATHERBOARDS™ cement board products from CertainTeed Corporation of Valley Forge, Pa.; MAXITILE™, MAXISHAKE™ AND MAXISLATE™ cement board products from MaxiTile Inc. of Carson, Calif.; BRESTONE™, CINDERSTONE™, LEDGESTONE™, NEWPORT BRICK™, SIERRA PREMIUM™ and VINTAGE BRICK™ cement board products from Nichiha U.S.A., Inc. of Norcross, Ga., EVERNICE™ cement board products from Zhangjiagang Evernice Building Materials Co., Ltd. of China and E BOARD™ cement board products from Everest Industries Ltd. of India.

The disclosed articles may be coated on one or more surfaces with one or more layers of the coating composition. For example, in one preferred embodiment the coating composition may include an optional primer layer and one or more topcoat layers. An optional sealer layer underneath the primer layer may also be utilized, if desired. Preferably, the various layers are selected to provide a coating system that has good adhesion to the substrate and between adjacent layers of the system.

Exemplary optional sealer layers include acrylic latex materials. The typical function of a sealer layer is to provide one or more features such as improved adhesion, efflorescence blocking, water resistance or blocking resistance. Non-limiting sealers include unpigmented or low pigment level latex coatings having, for example, between about 5 and 20 weight % solids. An example of a commercially available sealer is OLYMPIC™ FC sealer from PPG Industries.

Exemplary optional primer layers include acrylic latex or vinyl primers. The primer may include color pigments, if desired. Preferred primers have a 60-degree gloss value of less than about 15, more preferably less than about 10, and optimally less than about 5 percent. Preferred primers have a pigment volume concentration (PVC) greater than about 40%.

Other exemplary coating compositions for use under the coatings of this invention include those compositions and systems described in U.S. Patent Application Publication Nos. US 2007/0259166 A1 and US 2007/0259188 A1, and International Patent Application Nos. WO 2007/090132 A1 and WO 2007/089807 A1.

The disclosed compositions are formulated using multistage latex polymers. Further details concerning multistage latex polymers are contained in U.S. Patent Application Publication Nos. US 2006/0135684 A1, US 2006/0135686 A1 and US 2007/0110981. The multistage latex polymer is preferably prepared through chain-growth polymerization, using two or more ethylenically unsaturated monomers. Non-limiting examples of ethylenically unsaturated monomers include monomers such as acrylic acid, methacrylic acid, methyl acrylate, ethyl acrylate, propyl acrylate, butyl acrylate, 2-ethylhexyl acrylate, methyl methacrylate, ethyl methacrylate, propyl methacrylate, butyl methacrylate, 2-ethylhexyl methacrylate, hydroxyethyl acrylate, hydroxyethyl methacrylate, hydroxybutyl acrylate, hydroxybutyl methacrylate, hydroxypropyl acrylate, hydroxypropyl methacrylate, glycidyl acrylate, glycidyl methacrylate, 4-hydroxybutyl acrylate glycidylether, 4-hydroxybutyl methacrylate glycidylether, acrylamide, methylacrylamide, diacetone acrylamide, methylol (meth)acrylamide, acrylonitrile, styrene, a-methyl styrene, vinyl toluene, vinyl acetate, vinyl propionate, allyl methacrylate, or mixtures thereof. If desired, the latex polymer may be formed using one or more acidic monomers. For example, the latex polymers may include up to about 5 weight % methacrylic acid or acrylic acid based on the total latex polymer weight (viz., the total polymer solids weight).

The multistage latex polymer includes silane functionality, which may for example be provided by carrying out chain-growth polymerization in the presence of a silane coupling agent that contains a functional group capable of copolymerizing with, and which copolymerizes with, a monomer from which the multistage latex polymer is formed. Exemplary such silanes include monomeric, dipodal and oligomeric silanes containing a vinyl, allyl, (meth)acrylate or other ethylenically unsaturated group, or a mercapto group. Representative silanes include olefinic silanes such as vinyltrialkoxysilane, vinyltriacetoxy-silane, alkylvinyldialkoxysilane, hexenyltrialkoxysilane and the like, allyl silanes such as allyltrialkoxysilane, silane acrylates such as (3-acryloxypropyl) trimethoxysilane, γ-methacryloxypropyltrimethoxysilane and the like, and mercapto silanes such as 3-mercaptopropyltrimethoxysilane, 3-mercaptopropyltriethoxysilane, s-(octanoyl)mercaptopropyltriethoxysilane, 3-thiocyanatopropyltriethoxysilane, 3-mercaptopropylmethyldimethoxysilane, bis[3-(triethoxysilyl)propyl]-tetrasulfide, and bis[3-(triethoxysilyl)propyl]-disulfide. Commercially available silanes which may be reacted into the latex polymer during polymer formation include SELQUEST™ A-151 vinyl triethoxysilane, A-171 vinyl trimethoxysilane, A-172 vinyl-tris-(2-methoxyethoxy) silane, A-174 γ-methacryloxypropyltrimethoxysilane, and A-2171 vinyl methyldimethoxysilane, available from Momentive Performance Materials Inc. Silanes with multiple functionality may also be used such as DYNASYLAN™ HYDROSIL 2929, an amino/methacrylate functional silane from Degussa.

The multistage latex polymer may also be made silane-functional by combining the polymer with a silane coupling agent having a functional group (e.g., an epoxy, amino or isocyanato group) and reacting the functional group with functionality (e.g., acetoacetoxy, carboxy or amino functionality) on the already-formed latex polymer. Suitable epoxy-functional silanes include silanes having the formula:

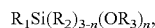

where n is 1, 2, or 3, the $R_1$ group contains at least one epoxy group and is alkyl, cycloalkyl, phenyl, cycloalkylalkyl, alkenylcycloalkyl, alkenylphenyl (e.g., benzyl), or phenylalkyl (e.g., tolyl). Each $R_2$ group is independently hydrogen, alkyl, cycloalkyl, phenyl, cycloalkylalkyl, alkenylcycloalkyl, alkenylphenyl (e.g., benzyl), phenylalkyl (e.g., tolyl), or a silane oligomer, wherein each $R_2$ group can optionally include $OR_3$ groups or epoxy functionality. Each $R_3$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Preferred epoxy-functional silanes have an average molecular weight of from about 140 to about 500 g/mole, more preferably from about 150 to about 300. In one preferred embodiment, the molecular weight does not exceed a maximum of about 190 to about 250, n is 1 or 2, $R_1$ is an alkyl group of 3 to 8 carbon atoms containing no more than one epoxy group, and $R_2$ is a methoxy or ethoxy group.

Exemplary epoxy-functional silanes include β-(3,4 epoxycyclohexyl)-ethyltrimethoxysilane (available from Mitsubishi International Corporation as KBM303), r-glycidoxypropyl-trimethoxysilane (available from Mitsubishi International Corporation as KBM403), r-glycidoxypropyl-methyldiethoxysilane (available from Mitsubishi International Corporation as KBE402), glycidoxypropyltrimethoxysilane (available from Dow Corning as Z-6040), glycidoxypropyltriethoxysilane (available from Dow Corning as Z-6041), γ-glycidoxypropyltriethoxysilane (available from GE Silicones as SILQUEST™ A-187), glycidoxypropylmethyldimethoxysilane (available from Dow Corning as Z-6044), glycidoxy-propylmethyldiethoxysilane (available from Dow Corning as Z-6042), and epoxycyclohexyl-ethyltrimethoxysilane (available from Dow Corning as Z-6043), 5,6-epoxyhexyltriethoxysilane (available from Gelest, Inc. as SIE4675.0), hydrolyzates of the above and the like.

Suitable amino-functional silanes include silanes having the formula:

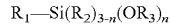

where n is 1, 2, or 3, the $R_1$ group contains at lest one amino group and is alkyl, cycloalkyl, phenyl, cycloalkylalkyl, alkenylcycloalkyl, alkenylphenyl (e.g., benzyl), or phenylalkyl (e.g., tolyl). Each $R_2$ group is independently hydrogen, alkyl, cycloalkyl, phenyl, cycloalkylalkyl, alkenylcycloalkyl, alkenylphenyl (e.g., benzyl), or phenylalkyl (e.g., tolyl), or a silane oligomer, wherein each $R_2$ group can optionally include $OR_3$ groups or amino functionality. Each $R_3$ group is independently hydrogen, alkyl, cycloalkyl, phenyl, cycloalkylalkyl, alkenylcycloalkyl, alkenylphenyl (e.g., benzyl), or phenylalkyl (e.g., tolyl). Preferred amino-functional silanes have an average molecular weight of from about 140 to about 500, more preferably from about 150 to about 300. In one embodiment, it is preferred that the number average molecular weight not exceed a maximum of about 190 to about 250, that n is 1 or 2, $R_1$ is an alkyl group having from 3 to 8 carbon atoms and containing no more than one amino group, and $R_2$ is a methoxy or ethoxy group.

Exemplary amino-functional silanes include trimethoxysilylpropyldiethylene-triamine, N-methylaminopropyltrimethoxysilane, aminoethylaminopropylmethyl-dimethoxysilane, aminoethylaminopropyltrimethoxysilane (available from Dow Corning as Z-6020), aminopropylmethyldimethoxysilane, aminopropyltrimethoxysilane, polymeric amino-alkylsilicone, aminoethylaminoethylaminopropyl-trimethoxysilane, N-methylaminopropyltrimethoxysilane, methylamino-propyltrimethoxysilane, aminopropylmethyldiethoxysilane, aminopropyltriethoxysilane, 4-aminobutyltriethoxysilane, oligomeric aminoalkylsilane, m-aminophenyltrimethoxysilane, phenylaminopropyltrimethoxysilane, 1,1,2,4-tetramethyl-1-sila-2-azacyclopentane, aminoethylaminopropyltriethoxysilane, aminoethylaminoisobutyl-methyldimethoxysilane, benzylethylenediaminepropyltrimethoxysilane, hydrolyzates of the above and the like.

Practical considerations such as solubility, hydrolysis rate, compatibility with the coating composition, polymer stability, and the like, may be considered when selecting the structure and molecular weight of the silane and choosing whether to react the silane with a monomer from which the multistage latex polymer is formed, or to react the silane with functionality on the already-formed latex polymer. Both approaches may be used if desired. The coating composition may if desired also contain a separate silane coupling agent (e.g., a silane monomer, oligomer or polymer) or unreacted functional silane in order to augment or complement the performance of the silane-functional multistage polymer. Exemplary silane coupling agents include alkoxysilanes such as bis(triethoxysilylethane, 1,2bis(trimethoxysilyl)decane, (trimethoxysilyl)ethane and bis[(3-methyldimethoxysilyl)propyl]-polypropylene oxide; carboxylate silanes such as carboxyethylsilanetriol sodium salt; hydroxy silanes such as bis(2-hydroxyethyl)-3-aminopropyl-triethoxysilane, triethoxysilylmethanol, N-(triethoxysilylpropyl)-o-polyethylene oxide urethane and N-(3-triethoxysilylpropyl)gluconamide; phosphine and phosphate silanes such as diethylphosphatoethyltriethoxysilane and 3-trihydroxysilylpropylmethylphosphonate, sodium salt; and sulfonate silanes such as 3-(trihydroxysilyl)1-lpropane-sulfonic acid. The silane may also be a polymeric silane such as triethoxysilyl modified poly-1,2-butadiene From Gelest, Inc. and aminoalkyl silsesquioxane oligomers from Gelest, Inc.

Whether the multistage latex polymer is made silane-functional by reacting the silane into the polymer during polymer formation or onto the polymer after polymer formation, the disclosed coating compositions may for example contain at least about 0.2 weight %, at least about 0.5 weight %, or at least about 0.7 weight % silane, based on a comparison of the weight of silane starting material to the latex polymer weight. The multistage latex polymer may for example contain less than about 10 weight %, less than about 6 weight %, or less than about 4 weight % silane, based on the latex polymer weight.

Acetoacetyl functionality may be incorporated into the polymer through the use of an acetoacetyl-functional olefinic monomer such as acetoacetoxyethyl acrylate, aceto-acetoxypropyl methacrylate, allyl acetoacetate, acetoacetoxybutyl methacrylate, 2,3-di(acetoacetoxy)propyl methacrylate, 2-(acetoacetoxy) ethyl methacrylate, t-butyl acetoacetate, and the like or combinations thereof. The acetoacetyl-functional latex polymer may for example be prepared through chain-growth polymerization, using, for example AAEM. A polymerizable hydroxy-functional or other active hydrogen containing monomer may also be converted to the corresponding acetoacetyl-functional monomer by reaction with diketene or other acetoacetylating agent (see, e.g., Comparison of Methods for the Preparation of Acetoacetylated Coating Resins, Witzeman, J. S.; Dell Nottingham, W.; Del Rector, F. J. Coatings Technology; Vol. 62, 1990, 101 (and citations contained therein)). The latex polymer may for example include at least about 0.5 weight % acetoacetyl functionality, about 0.5 to about 5 weight % acetoacetyl functionality, or about 2 to about 7.5 weight % acetoacetyl functionality based on the total latex polymer weight. Functionalized latex polymers are further described in U.S. Patent Application Publication Nos. US 2006/0135684 A1 and US 2006/0135686 A1. When present, the acetoacetyl functional group preferably is incorporated into the latex polymer using 2-(acetoacetoxy) ethyl methacrylate, t-butyl acetoacetate, diketene, or combinations thereof.

Exemplary multistage latex polymer compositions contain at least two polymers of different glass transition temperatures (viz., different Tg values) and may be prepared via emulsion polymerization using many of the aforementioned monomers. In one preferred embodiment, the latex will include a first polymer stage (the "soft stage") having a Tg less than 30° C., e.g., between about −65 and 30° C., more preferably between about −15 and 25° C., and most preferably between about −5 and 15° C. and a second polymer stage (the "hard stage") having a Tg greater than 30° C., e.g., between about 30 and 230° C., more preferably between about 30 and 125° C., and most preferably between 60 and 100° C. The ratios of monomers in the disclosed multistage latex polymers may be adjusted to provide the desired level of "hard stage" or "soft stage" segments. The Fox equation may be employed to calculate the theoretical Tg of a polymer made from two monomer feeds:

$$1/Tg = W_a/T_{ga} + W_b/T_{gb}$$

where: $T_{ga}$ and $T_{gb}$ are the respective glass transition temperatures of polymers made from monomers "a" and "b"; and $W_a$ and $W_b$ are the respective weight fractions of polymers "a" and "b". Multistage latexes are conveniently produced by sequential monomer feeding techniques. For example, a first monomer composition is fed during the early stages of the polymerization, and then a second different monomer composition is fed during the later stages of the polymerization. In certain embodiments it may be favorable to start the polymerization with a high Tg monomer composition and then switch to a low Tg monomer composition, while in other embodiments, it may be favorable to start the polymerization with a low Tg monomer composition and then switch to a high Tg monomer composition.

A plurality of hard and soft stages may also be utilized. For example, in certain compositions it may be beneficial to polymerize two different low Tg soft stage monomer compositions after the hard stage polymer is formed. The first soft stage may be for example prepared with a monomer whose homopolymer has a Tg close to room temperature (e.g., 20° C.) and the second soft stage may be prepared with monomer whose homopolymer has a Tg well below room temperature (e.g., less than 5° C.). While not intending to be bound by theory, it is believed that this second soft stage polymer assists with improving coalescence of the latex polymer particles.

It may be advantageous to use a gradient Tg latex polymer made using continuously varying monomer feeds. The resulting polymer will typically have a DSC curve that exhibits no Tg inflection points, and could be said to have an essentially infinite number of Tg stages. For example, one may start with a high Tg monomer composition and then at a certain point in the polymerization start to feed a low Tg soft stage monomer composition into the reactor with the high Tg hard stage monomer feed or into the high Tg hard stage monomer feed. The resulting multistage latex polymer will have a gradient Tg from high to low. A gradient Tg polymer may also be used in conjunction with multiple multistage Tg polymers. As an example, a high Tg monomer feed (F1) and a low Tg monomer feed (F2) can be prepared. The process would begin by adding feed F1 into the latex reactor vessel and initiating polymerization. After a certain period during the F1 feed, the feed F2 is added into F1 wherein the F2 feed rate is faster than the overall feed rate of F1+F2 into the reactor vessel. Consequently, once the F2 feed into F1 is complete, the overall Tg of the F1+F2 monomer feed blend will be a lower Tg "soft stage" monomer composition.

The disclosed multistage latex polymer compositions preferably include about 5 to about 95 weight percent soft stage polymer morphology, more preferably about 50 to about 90 weight percent soft stage polymer morphology, and most preferably about 60 to about 80 weight percent soft stage polymer morphology based on total latex polymer weight. The disclosed multistage latex polymer compositions preferably include about 5 to 95 weight percent hard stage polymer morphology, more preferably about 10 to about 50 weight percent hard stage polymer morphology, and most preferably about 20 to about 40 weight percent hard stage polymer morphology based on total latex polymer weight.

For example, a soft segment may be introduced by providing a monomer composition containing 5 to 65 parts butyl acrylate, 20 to 90 parts butyl methacrylate, 0 to 55 parts methyl methacrylate, 0.5 to 5 parts (meth)acrylic acid, 0 to 20 parts AAEM and 0.1 to 2 parts olefinic silane. A hard segment may be introduced by providing a monomer composition including 0 to 20 parts butyl acrylate, 0 to 40 parts butyl methacrylate, 45 to 95 parts methyl methacrylate, 0.5 to 5 parts (meth)acrylic acid, 0 to 20 parts AAEM and 0.1 to 2 parts olefinic silane. The olefinic silane may be reacted into either or both of the soft and hard segments. Silane functionality may instead or in addition be reacted onto the already-formed multistage latex polymer via reaction with functionality on either or both of the soft and hard segments.

The aforementioned multistage latex polymers are illustrative and other multistage latex polymers may be used in the practice of this invention. For example, the multistage latex polymer may be prepared with a high Tg alkali-soluble polymer hard stage. Alkali-soluble polymers may be prepared by making a polymer with acrylic or methacrylic acid or other polymerizable acid monomer (usually at greater than 7 weight %) and solubilizing the polymer by addition of ammonia or other base. Examples of suitable alkali-soluble high Tg support polymers include JONCRYL™ 675 and JONCRYL 678 oligomer resins, available from BASF. A low Tg soft stage monomer composition or gradient Tg composition could then be polymerized in the presence of the hard stage alkali-soluble polymer to prepare a multistage latex polymer. Another exemplary process for preparing alkali soluble supported polymers is described in U.S. Pat. No. 5,962,571. For coating compositions containing acetoacetyl-functional polymers (particularly clear coatings), a nitrogen-free base (e.g., an inorganic metal base such as KOH, CaOH, NaOH, LiOH, etc.) may be beneficial. If desired, the disclosed coating compositions may also contain non-silane-functional latex polymers, including non-silane-functional multistage latex polymers.

The disclosed multistage latex polymers may be stabilized by one or more nonionic or anionic emulsifiers (e.g., surfactants), used either alone or together. Examples of suitable nonionic emulsifiers include tert-octylphenoxyethylpoly (39)-ethoxyethanol, dodecyloxypoly(10)ethoxyethanol, nonylphenoxyethyl-poly(40)ethoxyethanol, polyethylene glycol 2000 monooleate, ethoxylated castor oil, fluorinated alkyl esters and alkoxylates, polyoxyethylene (20) sorbitan monolaurate, sucrose monococoate, di(2-butyl)-phenoxypoly(20)ethoxyethanol, hydroxyethylcellulosepolybutyl acrylate graft copolymer, dimethyl silicone polyalkylene oxide graft copolymer, poly(ethylene oxide)poly(butyl acrylate) block copolymer, block copolymers of propylene oxide and ethylene oxide, 2,4,7,9-tetramethyl-5-decyne-4,7-diol ethoxylated with ethylene oxide, N-polyoxyethylene(20)lauramide, N-lauryl-N-polyoxyethylene(3)amine and poly(10) ethylene glycol dodecyl thioether thioether. Examples of suitable anionic emulsifiers include sodium lauryl sulfate, sodium dodecylbenzenesulfonate, potassium stearate, sodium dioctyl sulfosuccinate, sodium dodecyldiphenyloxide disulfonate, nonylphenoxyethylpoly(1)ethoxyethyl sulfate ammonium salt, sodium styrene sulfonate, sodium dodecyl allyl sulfosuccinate, linseed oil fatty acid, sodium, potassium, or ammonium salts of phosphate esters of ethoxylated nonylphenol or tridecyl alcohol, sodium octoxynol-3-sulfonate, sodium cocoyl sarcocinate, sodium 1-alkoxy-2-hydroxypropyl sulfonate, sodium alpha-olefin ($C_{14}$-$C_{16}$) sulfonate, sulfates of hydroxyalkanols, tetrasodium N-(1,2-dicarboxy ethyl)-N-octadecylsulfosuccinamate, disodium N-octadecylsulfosuccinamate, disodium alkylamido polyethoxy sulfosuccinate, disodium ethoxylated nonylphenol half ester of sulfosuccinic acid and the sodium salt of tert-octylphenoxyethoxypoly(39)ethoxyethyl sulfate.

One or more water-soluble free radical initiators typically are used in the chain-growth polymerization of the multistage latex polymer. Initiators suitable for use in the coating compositions will be known to persons having ordinary skill in the art or can be determined using standard methods. Representative water-soluble free radical initiators include hydrogen peroxide; tert-butyl peroxide; alkali metal persulfates such as sodium, potassium and lithium persulfate; ammonium persulfate; and mixtures of such initiators with a reducing agent. Representative reducing agents include sulfites such as alkali metal metabisulfite, hydrosulfite, and hyposulfite; sodium formaldehyde sulfoxylate; and reducing sugars such as ascorbic acid and isoascorbic acid. The amount of initiator is preferably from about 0.01 to about 3 weight %, based on the total amount of monomer. In a redox system the amount of reducing agent is preferably from 0.01 to 3 weight %, based on the total amount of monomer. The polymerization reaction can be performed at a temperature in the range of from about 10 to about 100° C.

The disclosed coating compositions may for example include a multistage latex polymer in an amount of at least 10 weight %, at least 25 weight %, or at least 35 weight %, based on total composition solids. The multistage polymer amount is less than 100 weight %, and may for example be less than 85 weight % or less than 80 weight %, based on total composition solids.

The disclosed coating compositions may contain a variety of adjuvants which will be familiar to persons having ordinary skill in the art or which can be determined using standard methods. For example, the coating compositions may contain one or more optional coalescents to facilitate film formation. Exemplary coalescents include glycol ethers such as EASTMAN™ EP, EASTMAN DM, EASTMAN DE, EASTMAN DP, EASTMAN DB and EASTMAN PM from Eastman Chemical Co. and ester alcohols such as TEXANOL™ ester alcohol from Eastman Chemical Co. Preferably, the optional coalescent is a low VOC coalescent such as is described in U.S. Pat. No. 6,762,230 B2. The coating compositions preferably include a low VOC coalescent in an amount of at least about 0.5 weight %, more preferably at least about 1 weight %, and yet more preferably at least about 2 weight %. The coating compositions also preferably include a low VOC coalescent in an amount of less than about 10 weight %, more preferably less than about 6 weight %, and yet more preferably less than about 4 weight %, based on the latex polymer weight.

The disclosed coating compositions may include a surface-active agent (surfactant) that modifies the interaction of the coating composition with the substrate or with a prior applied coating. The surface-active agent affects qualities of the composition including how the composition is handled, how it spreads across the surface of the substrate, and how it bonds to the substrate. In particular, the agent can modify the ability of the composition to wet a substrate. Surface-active agents may also provide leveling, defoaming or flow control properties, and the like. If used, the surface-active agent is preferably present in an amount of less than 5 weight %, based on the total coating composition weight. Exemplary surface-active agents include those available under the trade designations STRODEX™ KK-95H, STRODEX PLF100, STRODEX PKOVOC, STRODEX LFK70, STRODEX SEK50D and DEXTROL™ OC50 from Dexter Chemical L.L.C. of Bronx, N.Y.; HYDROPALAT™ 100, HYDROPALAT 140, HYDROPALAT 44, HYDROPALAT 5040 and HYDROPALAT 3204 from Cognis Corp. of Cincinnati, Ohio; LIPOLIN™ A, DISPERS™ 660C, DISPERS 715W and DISPERS 750W from Degussa Corp. of Parsippany, N.J.; BYK™ 156, BYK 2001 and ANTI-TERRA™ 207 from Byk Chemie of Wallingford, Conn.; DISPEX™ A40, DISPEX N40, DISPEX R50, DISPEX G40, DISPEX GA40, EFKA™ 1500, EFKA 1501, EFKA 1502, EFKA 1503, EFKA 3034, EFKA 3522, EFKA 3580, EFKA 3772, EFKA 4500, EFKA 4510, EFKA 4520, EFKA 4530, EFKA 4540, EFKA 4550, EFKA 4560, EFKA 4570, EFKA 6220, EFKA 6225, EFKA 6230 and EFKA 6525 from Ciba Specialty Chemicals of Tarrytown, N.Y.; SURFYNOL™ CT-111, SURFYNOL CT-121, SURFYNOL CT-131, SURFYNOL CT-211, SURFYNOL CT 231, SURFYNOL CT-136, SURFYNOL CT-151, SURFYNOL CT-171, SURFYNOL CT-234, CARBOWET™ DC-01, SURFYNOL 104, SURFYNOL PSA-336, SURFYNOL 420, SURFYNOL 440, ENVIROGEM™ AD-01 and ENVIROGEM AE01 from Air Products & Chemicals, Inc. of Allentown, Pa.; TAMOLM 1124, TAMOL 850, TAMOL 681, TAMOL 731 and TAMOL SG-1 from Rohm and Haas Co. of Philadelphia, Pa.; IGEPAL™ CO-210, IGEPAL CO-430, IGEPAL CO-630, IGEPAL CO-730, and IGEPAL CO-890 from Rhodia Inc. of Cranbury, N.J.; T-DET™ and T-MULZ™ products from Harcros Chemicals Inc. of Kansas City, Kans.; polydimethylsiloxane surface-active agents (such as those available under the trade designations SILWET™ L-760 and SILWET L-7622 from OSI Specialties, South Charleston, W. Va., or BYK 306 from Byk Chemie) and fluorinated surface-active agents (such as that commercially available as FLUORAD FC-430 from 3M Co., St. Paul, Minn.). The surface-active agent may be a defoamer. Exemplary defoamers include BYK 018, BYK 019, BYK 020, BYK 022, BYK 025, BYK 032, BYK 033, BYK 034, BYK 038, BYK 040, BYK 051, BYK 060, BYK 070, BYK 077 and BYK 500 from Byk Chemie; SURFYNOL DF-695, SURFYNOL DF-75, SURFYNOL DF-62, SURFYNOL DF-40 and SURFYNOL DF-11 OD from Air Products & Chemicals, Inc.; DEEFO™ 3010A, DEEFO 2020E/50, DEEFO 215, DEEFO 806-102 and AGITAN™ 31BP from Munzing Chemie GmbH of Heilbronn, Germany; EFKA 2526, EFKA 2527 and EFKA 2550 from Ciba Specialty Chemicals; FOAMAX™ 8050, FOAMAX 1488, FOAMAX 7447, FOAMAX 800, FOAMAX 1495 and FOAMAX 810 from Degussa Corp.; FOAMASTER™ 714, FOAMASTER A410, FOAMASTER 111, FOAMASTER 333, FOAMASTER 306, FOAMASTER SA-3, FOAMASTER AP, DEHYDRAN™ 1620, DEHYDRAN 1923 and DEHYDRAN 671 from Cognis Corp.

Exemplary coating compositions may contain one or more optional pigments. Pigments suitable for use in the coating compositions will be known to persons having ordinary skill in the art or can be determined using standard methods. Exemplary pigments include titanium dioxide white, carbon black, lampblack, black iron oxide, red iron oxide, yellow iron oxide, brown iron oxide (a blend of red and yellow oxide with black), phthalocyanine green, phthalocyanine blue, organic reds (such as naphthol red, quinacridone red and toulidine red), quinacridone magenta, quinacridone violet, DNA orange, or organic yellows (such as Hansa yellow). The composition can also include a gloss control additive or an optical brightener, such as that commercially available under the trade designation UVITEX™ OB from Ciba-Geigy.

In certain embodiments it is advantageous to include fillers or inert ingredients in the coating composition. Fillers or inert ingredients extend, lower the cost of, alter the appearance of, or provide desirable characteristics to the composition before and after curing. Exemplary fillers or inert ingredients include, for example, clay, glass beads, calcium carbonate, talc, silicas, feldspar, mica, barytes, ceramic microspheres, calcium metasilicates, organic fillers, and the like. For example, the composition may include abrasion resistance promoting adjuvants such as silica or aluminum oxide (e.g., sol gel processed aluminum oxide). Suitable fillers or inert ingredients are preferably present in an amount of less than 15 weight %, based on the total coating composition weight.

The disclosed coating compositions may include wax emulsions to improve coating physical performance or rheology control agents to improve application properties. Exemplary wax emulsions include MICHEM™ Emulsions 32535, 21030, 61335, 80939M and 7173MOD from Michelman, Inc. of Cincinnati, Ohio and CHEMCOR™ 20N35, 43A40, 950C25 and 10N30 from ChemCor of Chester, N.Y. Exemplary rheology control agents include RHEOVIS™ 112, RHEOVIS 132, RHEOVIS152, VISCALEX™ HV30, VISCALEX AT88, EFKA 6220 and EFKA 6225 from Ciba Specialty Chemicals; BYK 420 and BYK 425 from Byk Chemie; RHEOLATE™ 205, RHEOLATE 420 and RHEOLATE 1 from Elementis Specialties of Hightstown, N.J.; ACRYSOL™ L TT-615, ACRYSOL RM-5, ACRYSOL RM-6, ACRYSOL RM-8W, ACRYSOL RM-2020 and ACRYSOL RM-825 from Rohm and Haas Co.; NATROSOL™ 250LR from Hercules Inc. of Wilmington, Del. and CELLOSIZE™ QP09L from Dow Chemical Co. of Midland, Mich.

The disclosed coating compositions may include a biocide, fungicide, mildewcide or other preservative. Exemplary such materials include KATHON™ LX microbicide, ROZONE™ 2000 fungicide and ROCIMA™ 80 algicide from Rohm & Haas of Philadelphia, Pa., the BUSAN™ series of bactericides, fungicides and preservatives including BUSAN 1292 and 1440 from Buckman Laboratories of Memphis, Tenn.; the POLYPHASE™ series of bactericides, fungicides and algaecides including POLYPHASE™ 663 and 678 from Troy Chemical Corp. of Florham Park, N.J., the IRGAROL™ and NUOSEPT™ series of biocides including NUOSEPT 91, 101, 145, 166, 495, 497, 498, 515, 635W and 695 from International Specialties Products, the FUNGITROL™ series of fungicides including FUNGITROL C, 334, 404D, 720, 920, 960, 2002, and 2010 from International Specialties Products, and the DOWICIL™ series of antimicrobials and preservatives including DOWICIL 75, 96, 150, 200, and QC-20 from Dow Chemical Co.

The coating composition may also include other adjuvants which modify properties of the coating composition as it is stored, handled, or applied, and at other or subsequent stages. Desirable performance characteristics include chemical resistance, abrasion resistance, hardness, gloss, reflectivity, appearance, or combinations of these characteristics, and other similar characteristics. Many suitable adjuvants are described in Koleske et al., Paint and Coatings Industry, April, 2003, pages 12-86 or will be familiar to those skilled in the art. Representative adjuvants include amines, anti-cratering agents, colorants, curing indicators, dispersants, dyes, flatting agents (e.g., BYK CERAFLOUR™ 920 from Byk Chemie), glycols, heat stabilizers, leveling agents, mar and abrasion additives, optical brighteners, plasticizers, sedimentation inhibitors, thickeners, ultraviolet-light absorbers and the like to modify properties.

The disclosed coating compositions preferably have a minimum film forming temperature (MFFT) about 0 to about 55° C., more preferably about 0 to about 20° C., when tested with a Rhopoint 1212/42, MFFT Bar-60, available from Rhopoint Instruments Ltd. of East Sussex, United Kingdom. The coating compositions when dried or otherwise hardened may for example have a total thickness between about 5 and about 200 micrometers, between about 10 and 150 micrometers, or between about 15 and 100 micrometers. The compositions preferably have a PVC (pigment volume concentration) of less than about 50 percent, more preferably less than about 35 percent, and most preferably less than about 25 percent. The compositions preferably include less than 10 weight %, more preferably less than 7 weight %, and most preferably less than 4 weight % total VOCs based upon the total composition weight.

The coating composition may be applied directly to the substrate or to an optionally sealed or primed substrate using any suitable application method. For example, the coating composition may be roll coated, sprayed, curtain coated, vacuum coated, brushed, or flood coated using an air knife system. For field applied coating systems, e.g., cement garage floors, floor tiles, decks, and the like, the coating desirably is applied by rolling, spraying, or brushing. For factory-applied applications, preferred application methods provide a uniform coating thickness and are cost efficient. Especially preferred application methods employ factory equipment which moves a substrate with a first major surface past a coating head and thence past suitable drying or curing equipment. The coating composition desirably covers at least a portion of the first major surface of the substrate, and preferably covers the entire first major surface, in a substantially uniformly thick layer. Accordingly, the disclosed coated articles preferably are coated on at least one major surface with the coating composition. More preferably, the coated articles are coated on a major surface and up to four minor surfaces including any edges. Most preferably, the coated articles are coated on all (e.g., both) major surfaces, and up to four minor surfaces including any edges.

Crush Resistance

Preferred coatings resist crush damage. Coated products (e.g., fiber cement siding products) may be evaluated using a Visual Assessment of Crush Resistance test as described in U.S. Patent Application No. 2007/0110981, published May 17, 2007 and the following 1 to 5 rating scale, with 5 being essentially no damage and 1 being severe coating damage:

| Visual Assessment | |
|---|---|
| Rating value | Panel Appearance |
| 1 | Obviously crushed: Peaks are severely crushed and the grain pattern from the opposing board is embossed into the coating, causing severe wrinkling of the coating around the damaged area. |
| 2 | Moderately crushed: Peaks show flattening to widths over 4 mm, and the grain pattern from the opposing board is slightly embossed into the coating |
| 3 | Slightly crushed: Many peaks show flattening to a width of 2 mm to 4 mm. |
| 4 | Very slightly crushed: A few peaks show peak flattening to a width less than 2 mm. |
| 5 | Uncrushed: no crushed peaks or glossy spots are visible to the unaided eye or with 5× magnification. |

The disclosed coatings preferably provide crush resistance of at least 3, more preferably at least 4 and most preferably 5 when two face-to-face coated embossed substrates are subjected to a pressure of about 6 kg/cm$^2$, more preferably about 8 kg/cm$^2$, and most preferably about 10 kg/cm$^2$. For example, the test board samples preferably achieve a rating of 3 or greater, more preferably 4 or greater, and optimally 5, when tested at a pressure of about 8 kg/cm$^2$.

Hot Tire Test Procedure

Preferred coatings also resist damage from hot tires. Coating substrates (e.g., coated cementitious substrates) may be evaluated by a visual assessment of hot tire pick up resistance as follows. Over a 6"×6" (15.24×15.24 cm) pre-cast concrete block the coating composition is applied at an application rate of 300 sq. ft./gal. (6.13 square meters per liter), with a minimum coated area of 3"×6" (7.62×15.24 cm) to accommodate an automobile tire section. After curing 4 hours, a second coat is applied. The coating is allowed to cure for 7 days at 20-25° C., and 35%-50% R.H. An automobile tire section, measuring approximately 6"×3" (15.24×7.62 cm), with wear approximating 6,000 to 10,000 miles (9660 to 16,090 km) is used in the test. A forced-convection laboratory oven is pre-heated to 140° F. (+/−2° F.) (60° C.) prior to placing the sample and tire sections into the oven for heated storage. After the coating has cured for 7 days, the test sample is submerged in water at 20-25° C. for 16 hours prior to initiating the test. After removing the test sample from the water bath, a wet cloth or towel is wrapped around the test sample, making sure it contacts the coating, and is placed in the pre-heated oven. The tire section to be used is placed in the oven also, though not on top of the sample at this point. Periodically, the cloth/towel is misted with water to maintain the moisture level. The test sample and tire section are allowed to remain in the oven for 1 hour. After 1 hour, the test sample and tire section are removed from the oven, and the cloth/towel is removed from the test sample. The test sample is placed on the lower plate of a laboratory press, with the coating facing up, and then the tire section is placed on top of the sample, centering the tire tread on the coated area of the sample. Using a contact area of 3"×6" (7.62×15.24 cm), a force of 2700 lbs. (1,224 kg) should be applied, generating 150 psi (1,034 kPa). This is intended to simulate the effect of a 5000 lb. (2,267 kg) vehicle driven onto the coated surface. The test sample and tire section is allowed to remain in the press for 1 hour. The press should be checked periodically to insure that the force applied remains constant. After 1 hour, the tire section and test sample are removed and evaluated. Observations are made as to whether any of the coating has delaminated from the surface. The coating is further examined and any marring, adhesion loss, or any latent prints/images left behind by the tire section are noted. In some cases, an image or print of the tire section may be left behind, but may not be readily visible unless the sample is tilted or observed at an angle. One portion of the coating should be cleaned with a commercial household cleaning product such as Formula 409™ cleaner from The Clorox Company, and it should be noted whether the cleaner has removed any prints or images that existed on the coating, and whether the cleaner stained the coating. The coating should exhibit no declamation, marring, imprinting or other scuffing that cannot be removed by light cleaning with the household cleaner.

Wet Adhesion and Early Water Resistance

Wet Adhesion and Early Water Resistance may be evaluated using a modified version of ASTM D3359-02, carried out as follows. Two coats of the coating composition are applied 4 hours apart at a dry film thickness of 0.02 mm to a Black Carrara Glass panel and allowed to dry for a further four hours at ambient temperature. The coated panels are partially immersed in a water bath for a period of 16-18 hours. Immediately following the immersion period, the paint films are evaluated for wet and dry adhesion using ASTM D3359, Test Method B. "Wet Adhesion" performance is rated based on the percent of coating removed. A visual inspection and subjective ratings of blister resistance and blush resistance are used to evaluate Early Water Resistance.

The following examples are offered to aid in understanding of the present invention and are not to be construed as limiting the scope thereof. Unless otherwise indicated, all parts and percentages are by weight. The Tg inflection points were determined using a Q SERIES™ DSC thermal analysis instrument from TA Instruments of New Castle, Del.

EXAMPLES

Example 1

Multistage Latex Polymer

An exemplary multistage silane-functional acetoacetyl-functional latex polymer may be prepared as follows. A reactor is charged with 500-800 parts of deionized water and 2-6 parts emulsifier. The reaction mixture is heated to 75°-80° C. under a nitrogen blanket. During heating, pre-emulsion 1 is formed having 75-250 parts of deionized water, 2-9 parts of emulsifier, 0.2-0.6 parts persulfate initiator, 50-150 parts of butyl acrylate, 0-200 parts of methylmethacrylate, 250-450 parts of butyl methacrylate, 0-40 parts of AAEM, 0-15 parts vinyl silane, and 5-30 parts of (meth)acrylic acid. In a separate vessel, pre-emulsion 2 is formed having 75-250 parts of deionized water, 2-9 parts of emulsifier, 0.2-0.6 parts persulfate initiator (e.g., sodium persulfate), 150-500 parts of methylmethacrylate, 5-100 parts of butyl acrylate, 0-40 parts of AAEM, 0-15 parts vinyl silane, and 5-30 parts of (meth) acrylic acid. After the reaction mixture reaches 75° C., 1-6 parts of persulfate initiator is added to the reactor and the pre-emulsion 1 is added over a 1-3 hour feed rate. After pre-emulsion 1 is added, the container is rinsed with 20 parts deionized water and pre-emulsion 2 is added over a 1-3 hour feed rate. The reaction temperature is held between 80° C. and 85° C. during polymerization. After the pre-emulsion 2 feed is complete, the container is rinsed with 20 parts of deionized water and the reaction is held 30 minutes. Post-reaction addition of 0.5-1.5 parts t-butyl hydroperoxide mixed with 20 parts of deionized water and 0.3-1.5 parts of isoascorbic acid mixed with 20 parts of deionized water are then added over 30 minutes. The resulting latex polymer is then cooled to 40° C., and 28% ammonia is added to adjust the pH to 7.5-8.5.

Example 2

Multistage Latex Polymer and Silane

Figure 4:
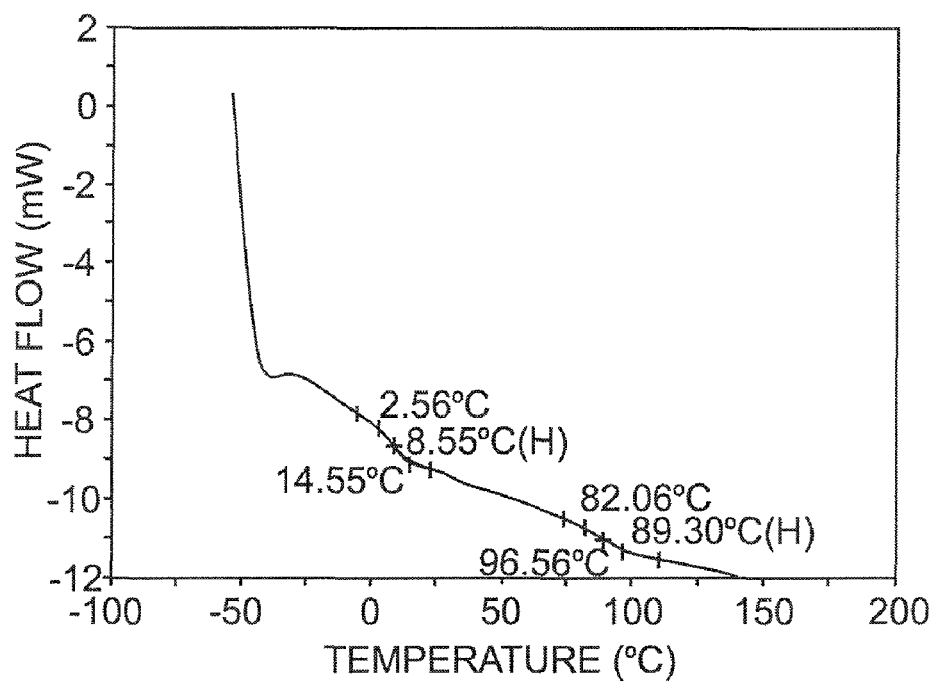
FIG. 4 and FIG. 5 are differential scanning calorimetry (DSC) curves respectively showing Tg values for the multistage latex polymers of Examples 2 and 3.

Using the method of Example 1, a multistage latex polymer was prepared from a first monomer mixture containing butyl acrylate, methyl methacrylate, butyl methacrylate, AAEM, acrylic acid and methacrylic acid and a second monomer mixture containing butyl acrylate, methyl methacrylate, AAEM and acrylic acid. Five parts AAEM were employed per 100 parts total monomer. 100 Parts of the multistage latex polymer were then combined with 0.8 parts γ-glycidoxypropyltriethoxysilane. FIG. 4 shows the DSC curve, and demonstrates that the polymer exhibited two distinct Tg values, namely a soft stage Tg at about 8.6° C. and a hard stage Tg at about 89.3° C. Solids were 40% and the MMFT was less than 10° C.

Example 3

Silane-Functional Multistage Latex Polymer

Figure 5:
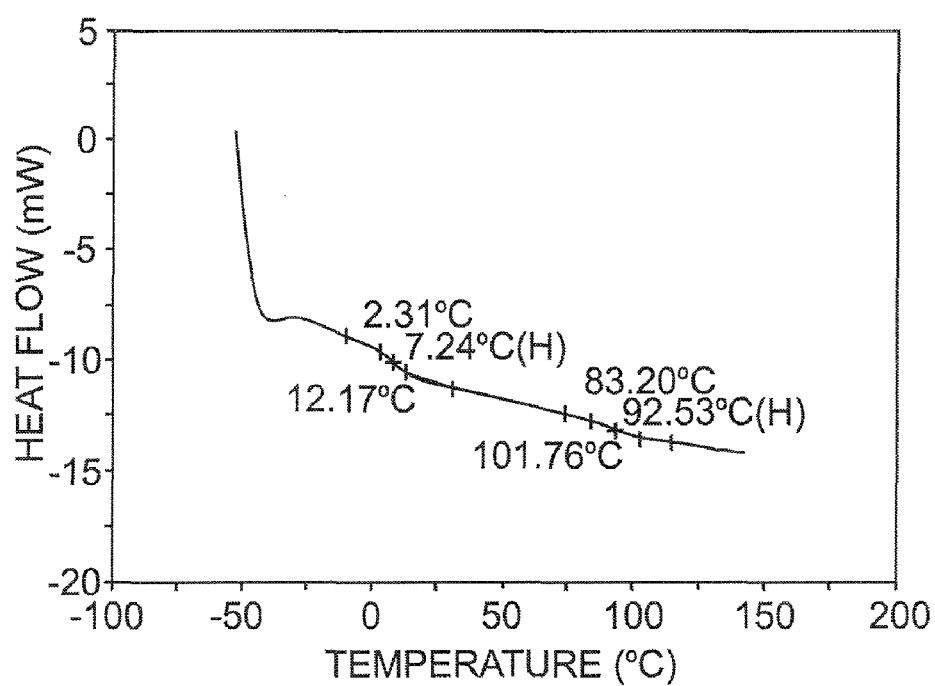

Using the method of Example 1, a silane-functional multistage latex polymer was prepared from a first monomer mixture containing butyl acrylate, methyl methacrylate, butyl methacrylate, AAEM, A-171 vinyl silane, acrylic acid and methacrylic acid and a second monomer mixture containing methyl methacrylate, butyl acrylate, AAEM, A-171 vinyl silane and acrylic acid. Five parts AAEM and 0.8 parts vinyl silane were employed per 100 parts total monomer. FIG. 5 shows the DSC curve, and demonstrates that the polymer exhibited two distinct Tg values, namely a soft stage Tg at about 7.2° C. and a hard stage Tg at about 92.5° C. Solids were 40% and the MMFT was less than 10° C.

Example 4

Multistage Latex Polymer and Silane

In a method like that of Example 2, the Example 1 multistage latex polymer could be combined with 0.8 parts aminopropyltriethoxysilane rather than 0.8 parts γ-glycidoxy-propyltriethoxysilane. The aminopropyltriethoxysilane would react at room temperature with the acetoacetyl functionality in the multistage latex polymer.

Examples 5a and 4b

Coating Compositions

An exemplary coating composition may be prepared as follows. In a mixing vessel equipped with a high-speed mixer and mixing blade mixer are charged 10 to 50 parts water and 40 to 85 parts of a multistage latex polymer solution. If desired, 0 to 20 parts other non-pigment additives may be introduced. If desired (for example, to make a pigmented coating rather than a clearcoat), up to about 50 parts of pigments or flatting agents may be introduced.

Two representative coating compositions were prepared by combining the ingredients shown below in Table 1 in the following order:

TABLE 1

| Ingredient | Supplier | Example 5a | Example 5b |
|---|---|---|---|
| Water | | 183 | 183 |
| Example 2 Polymer | | 645 | |
| Example 3 Polymer | | | 645 |
| SURFYNOL ™ PSA-336 wetting agent | Air Products and Chemicals, Inc. | 3 | 3 |
| BYK ™-024 defoamer | Altana AG | 3 | 3 |
| TEXANOL ™ ester alcohol coalescent | Eastman Chemical Company | 15 | 15 |
| Ammonium Hydroxide (28%) | Sigma-Aldrich Co. | 3 | 3 |
| POLYPHASE ™ 678 fungicide | Troy Corporation | 8 | 8 |
| 1,2-Benzisothiazol-3(2H)-one biocide | International Specialties Products | 1.5 | 1.5 |
| Ethylene Glycol | Sigma-Aldrich Co. | 9.3 | 9.3 |

The compositions may be mixed for about 15 minutes using moderate agitation to provide clear coating compositions containing 30.5 wt. % solids, 29.7 volume % solids, 92 g/liter VOC, a pH of about 8.5-9.5 and a viscosity (no. 2 Zahn Cup) of about 12-20 seconds. The coatings will have hardness results of about 30 seconds and average about 20 to 25 oscillations under ASTM test D-4366 at a dry film thickness of about 0.04 mm. The coatings will also have good Wet Adhesion and good Early Water Resistance. If the multistage latex polymer is replaced by a single stage polymer, the coatings will have reduced hardness results of about 15-20 seconds and about 5 to 15 oscillations. If the silane is not present, the coatings will have reduced Wet Adhesion and reduced Early Water Resistance.

Other embodiments of the invention include without limitation those listed below:

A method for preparing a coated article, which method comprises providing a cementitious substrate, coating at least a portion of the substrate with an aqueous coating composition comprising a silane-functional multistage latex polymer, and allowing the coating composition to harden.

A method according to paragraph [0076] wherein the multistage latex polymer is formed by chain-growth polymerization in the presence of a silane coupling agent containing a functional group capable of copolymerizing with a monomer from which the multistage latex polymer is formed.

A method according to paragraph [0077] wherein the silane coupling agent contains an ethylenically unsaturated group.

A method according to paragraph [0077] wherein the silane coupling agent comprises a vinyl silane.

A method according to paragraph [0077] wherein the silane-functional multistage polymer contains about 0.2 to about 10 weight % silane, based on a comparison of silane coupling agent weight to latex polymer weight.

A method according to paragraph [0077] wherein the silane-functional multistage polymer contains about 0.5 to about 6 weight % silane, based on a comparison of silane coupling agent weight to latex polymer weight.

A method according to paragraph [0076] wherein the multistage latex polymer is made silane-functional by reacting an already-formed multistage latex polymer with a silane coupling agent having a functional group which reacts with the already-formed polymer.

A method according to paragraph [0082] wherein the silane coupling agent comprises an epoxy silane or amino silane.

A method according to paragraph [0076] wherein the multistage latex polymer comprises at least one soft stage having a Tg between about −65 and about 30° C. and at least one hard stage having a Tg between about 30 and about 230° C.

A method according to paragraph [0076] wherein the multistage latex polymer comprises 50 to 90 weight % soft stage polymer morphology having a Tg between about −5 and 25° C. and 10 to 50 weight % hard stage polymer morphology having a Tg between about 30 and 105° C., based on total polymer weight.

A method according to paragraph [0076] wherein the multistage latex polymer has a gradient Tg.

A method according to paragraph [0076] wherein the multistage latex polymer has acetoacetoxy functionality.

A coated article comprising a cementitious substrate having at least one major surface on which is coated a layer comprising an aqueous coating composition comprising a silane-functional multistage latex polymer.

An article according to paragraph [0088] wherein the substrate comprises fiber cement.

An article according to paragraph [0088] wherein the substrate comprises fencing, roofing, flooring, decking, wall boards, shower boards, lap siding, vertical siding, soffit panels, trim boards, shaped edge shingle replicas, stone replicas or stucco replicas.

An article according to paragraph [0088] wherein the coating composition has a pigment volume concentration less than 45%.

An article according to paragraph [0088] wherein the coating composition has a minimum film forming temperature less than about 20° C.

An article according to paragraph [0088] wherein the coating composition when dried or otherwise hardened has a total thickness between about 10 and about 150 micrometers.

An article according to paragraph [0088] wherein the coating composition when dried or otherwise hardened has a Crush Resistance value of at least 3 when two face-to-face coated embossed fiber cement board substrates are subjected to a pressure of about 8 kg/cm$^2$.

An article according to paragraph [0088] wherein the multistage latex polymer is formed by chain-growth polymerization in the presence of a silane coupling agent containing a functional group capable of copolymerizing with a monomer from which the multistage latex polymer is formed.

An article according to paragraph [0095] wherein the silane coupling agent contains an ethylenically unsaturated group.

An article according to paragraph [0095] wherein the silane coupling agent comprises a vinyl silane.

An article according to paragraph [0095] wherein the silane-functional multistage polymer contains about 0.2 to about 10 weight % silane, based on a comparison of silane coupling agent weight to latex polymer weight.

An article according to paragraph [0088] wherein the multistage latex polymer comprises at least one soft stage having a Tg between about −65 and about 30° C. and at least one hard stage having a Tg between about 30 and about 230° C.

An article according to paragraph [0088] wherein the multistage latex polymer comprises 50 to 90 weight % soft stage polymer morphology having a Tg between about −5 and 25° C. and 10 to 50 weight % hard stage polymer morphology having a Tg between about 30 and 105° C., based on total polymer weight.

An article according to paragraph [0088] wherein the multistage latex polymer has a gradient Tg.

An article according to paragraph [0088] wherein the multistage latex polymer has acetoacetoxy functionality.

All patents, patent applications and literature cited in the specification are hereby incorporated by reference in their entirety. In the case of any inconsistencies, the present disclosure, including any definitions therein will prevail. The invention has been described with reference to various specific and preferred embodiments and techniques. However, it should be understood that many variations and modifications may be made while remaining within the invention.

Having thus described the preferred embodiments of the present invention, those of skill in the art will readily appreciate that the teachings found herein may be applied to yet other embodiments within the scope of the attached claims.

What is claimed is:

1. A coating composition, comprising a silane-functional, acetoacetoxy-functional multistage latex polymer, wherein the multistage latex polymer comprises at least one silane-functional soft stage having a Tg between about −65 and 30° C. and at least one hard stage having a Tg between about 30 and about 230° C.

2. The composition of claim 1, wherein the multistage latex polymer is formed by chain-growth polymerization in the presence of a silane coupling agent containing a functional group capable of copolymerizing with a monomer from which the multistage latex polymer is formed.

3. The composition of claim 2, wherein the silane coupling agent contains an ethylenically unsaturated group.

4. The composition of claim 2, wherein the silane coupling agent comprises a vinyl silane.

5. The composition of claim 2, wherein the silane coupling agent comprises a mercapto silane.

6. The composition of claim 2, wherein the silane-functional multistage polymer contains about 0.2 to about 10 weight % silane, based on a comparison of silane coupling agent weight to latex polymer weight.

7. The composition of claim 1, wherein the multistage latex polymer is made silane-functional by reacting an already-formed multistage latex polymer with a silane coupling agent having a functional group which reacts with the already-formed polymer.

8. The composition of claim 7, wherein the silane coupling agent comprises an epoxy silane.

9. The composition of claim 7, wherein the silane coupling agent comprises an amino silane.

10. The composition of claim 7, wherein the silane-functional multistage polymer contains about 0.2 to about 10 weight % silane, based on a comparison of silane coupling agent weight to latex polymer weight.

11. The composition of claim 1, wherein the multistage latex polymer comprises 50 to 90 weight % soft stage polymer morphology having a Tg between about −5 and 25° C. and 10 to 50 weight % hard stage polymer morphology having a Tg between about 30 and 105° C., based on total polymer weight.

12. The composition of claim 1, wherein the multistage latex polymer has a gradient Tg.

13. The composition of claim 1, wherein the composition contains less than 4% volatile organic compounds (VOCs).

14. The composition of claim 1, wherein the composition has a minimum film forming temperature less than about 20° C.

15. The composition of claim 1, wherein the composition when dried or otherwise hardened has a total thickness between about 10 and about 150 micrometers.

16. The composition of claim 1, wherein the composition when applied to embossed fiber cement board substrates and dried or otherwise hardened has a Crush Resistance value of at least 3 when two thus-coated substrates are placed face-to-face and subjected to a pressure of about 8 $kg/cm^2$.

17. A method for preparing a coated article, which method comprises providing a cementitious substrate, coating at least a portion of the substrate with an aqueous coating composition comprising a silane-functional acetoacetoxy-functional multistage latex polymer, comprising at least one silane-functional soft stage having a Tg between about −65 and 30° C. and at least one hard stage having a Tg between about 30 and about 230° C., and allowing the coating composition to harden.

18. A coated article comprising a cementitious substrate having at least one major surface on which is coated a layer comprising an aqueous coating composition comprising a silane-functional acetoacetoxy-functional multistage latex polymer wherein the multistage latex polymer comprises at least one silane-functional soft stage having a Tg between about −65 and 30° C. and at least one hard stage having a Tg between about 30 and about 230° C.

* * * * *